Sept. 18, 1956 P. ANDERSON 2,763,053
UNIVERSAL WORK POSITIONERS
Filed June 9, 1955 2 Sheets-Sheet 1
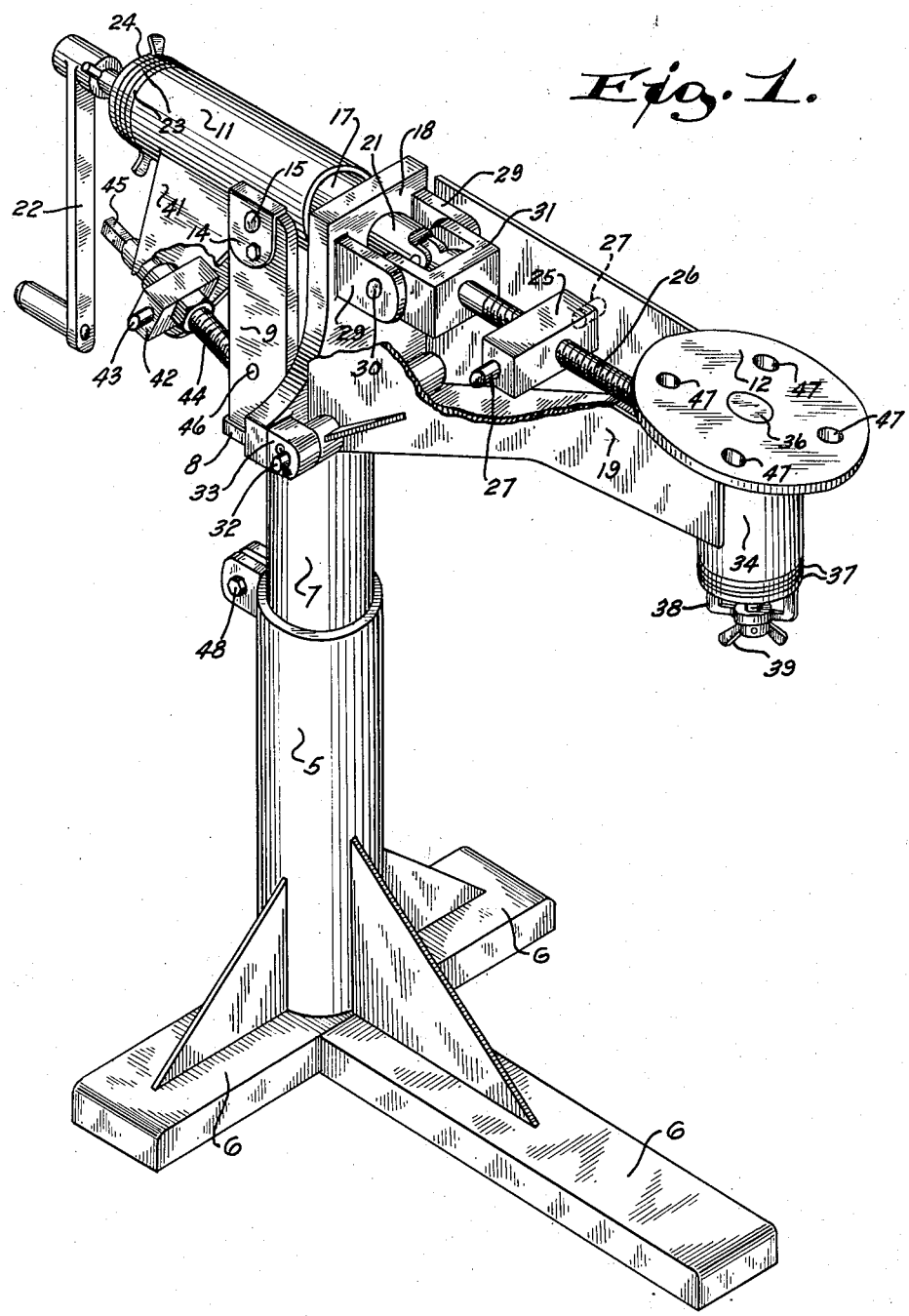

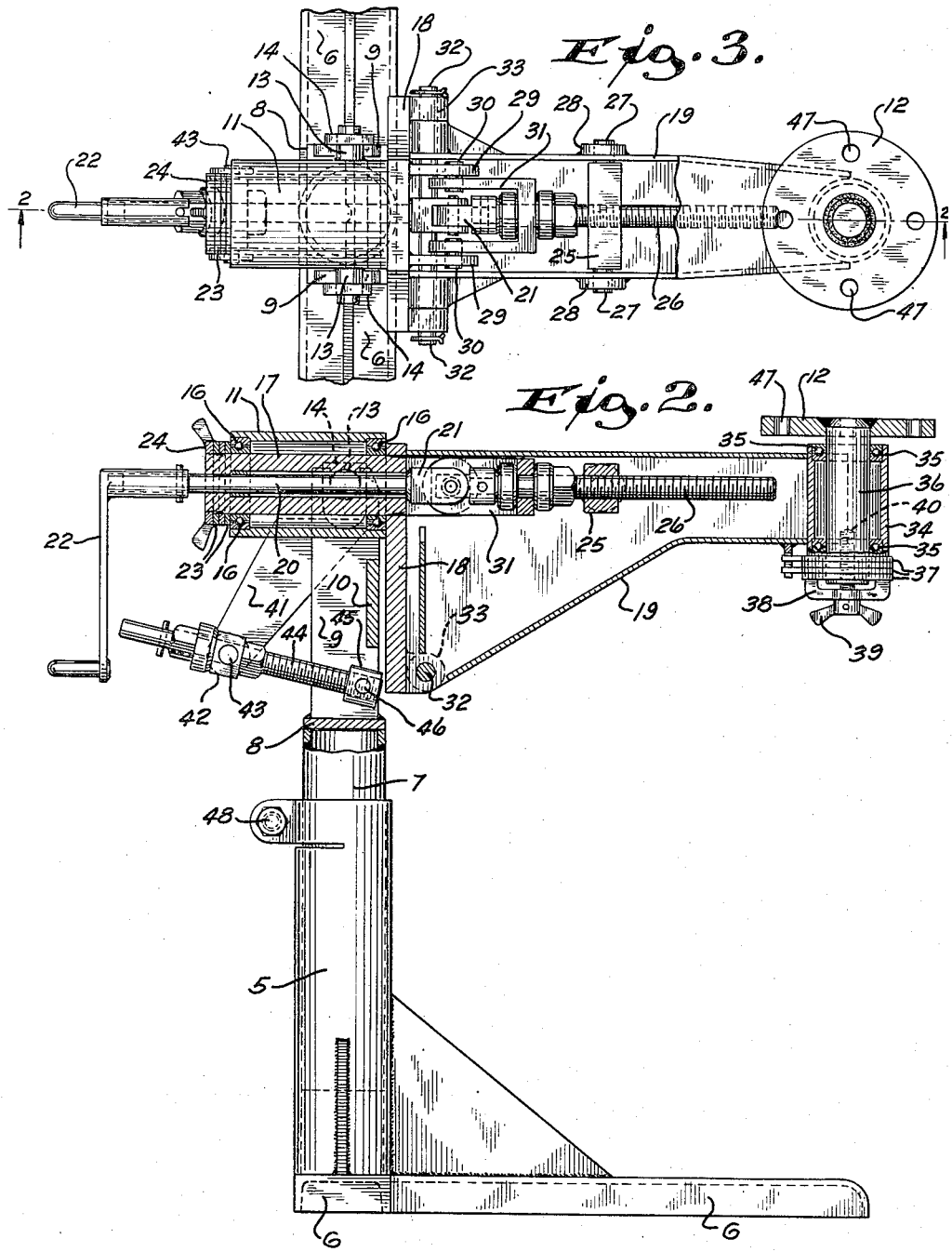

United States Patent Office 2,763,053
Patented Sept. 18, 1956

2,763,053

UNIVERSAL WORK POSITIONERS

Perry Anderson, Milwaukee, Wis., assignor to Wisconsin Hydraulics, Inc., Milwaukee, Wis., a corporation of Wisconsin Application June 9, 1955, Serial No. 514,143

4 Claims. (Cl. 29—288)

This invention relates to improvements in universal work positioners, and more particularly to a work supporting mechanism which may be universally adjusted so that an article mounted thereon may be conveniently presented, in any desired position, to a work tool.

A primary object of the present invention is to provide a work positioner and support by means of which articles of work of various shapes and sizes may be supported thereon in a balanced condition permitting the movement of the articles from any desired position to another position to render all portions of the work accessible to a tool.

The present universal work positioner is of the type which includes a work supporting table mounted on an arm having a universal joint connection with a rotatable shaft so that the arm and table may be secured in various positions to enable the center of gravity of the work, table and arm, to coincide with the axis of rotation of the rotatable shaft whereby the work will be maintained in a position of balance relative to the axis of rotation in any position about said axis.

A more specific object of the present invention is to provide in a universal work positioner of the type mentioned, means for easily manually accomplishing the various adjustments.

A further object of the invention is to provide a universal work positioner which is of simple construction, which is easy to operate, which will maintain the work thereon in a desired position of adjustment, which is strong and durable, and which is well adapted for the purposes described.

With the above and other objects in view, the invention consists of the improved universal work positioner, and its parts and combinations as set forth in the claims, and all equivalents thereof.

In the accompanying drawings in which the same reference characters indicate the same parts in all of the views:

Fig. 1 is a front and side perspective view of the improved universal work positioner with parts broken away and in section to show structural details;

Fig. 2 is a side view of the universal work positioner with the upper portion thereof being in vertical section, said view being taken approximately along the line 2—2 of Fig. 3; and Fig. 3 is a fragmentary plan view of the work positioner with a portion of the top plate of the arm being broken away to show internal mechanism.

The improved universal work positioner as illustrated includes a vertical tubular supporting sleeve 5 mounted on suitably affixed feet 6 which are adapted to engage a horizontal base or floor in a building or room in which the positioner is utilized. Adjustably telescopically and rotatably associated with the sleeve 5 is an upwardly projecting post 7 formed at its upper end with a transverse plate 8 which, at its opposite ends, supports a pair of transversely spaced-apart trunnion posts 9, connected by an intermediate transverse brace 10.

The numeral 11 represents a bearing housing about the axis of which the work mounted on a supporting table 12 may revolve to present any portion of the work conveniently to the worker or tool. Opposite side portions of the housing 11 are provided with laterally projecting trunnions 13 which are pivotally supported in U-shaped recesses therefor in the upper end portions of the trunnion posts 9. The outer end portions of the trunnions 13 are reduced and threaded and extend through retainer plates 14 and carry nuts or caps 15. The construction described is such that the housing 11 and parts carried thereby may be adjustably pivotally moved in a vertical plane into different angular positions relative to the upright support 5—7. Within the housing 11 and freely rotatable by virtue of interposed ball-bearing units 16, is an inner sleeve 17 which is of greater length than the outer housing 11 and projects beyond both ends thereof. The extended forward end of the inner sleeve 17 extends into an aperture in the rear plate 18 adjacent a hollow arm structure 19 and is welded thereto. An operating shaft 20 extends revolubly through the inner sleeve 17 axially thereof and its forward end portion (at the right relative to Fig. 2) is integral with a universal joint connection 21 housed within the rear end portion of the tubular arm 19. The rear end portion of the shaft 20 (toward the left in Fig. 2) has removably mounted thereon a hand crank 22. Several brake discs 23 are freely movably mounted on an external portion of the shaft 20 adjacent the end of the housing 11. The outer extended adjacent end portion of the inner sleeve 17 is threaded and carries a brake disc-applying plate 24 which, when turned in a direction to apply proper pressure to the brake discs 23, will bind the inner sleeve 17 to the outer housing 11. Under such adjustment when the shaft 20 is turned through the crank 22, up and down knee action will be imparted to the arm 19 and work supporting table 12 through the associated mechanism later to be described.

Within the hollow arm 19, intermediate the ends thereof, is a transverse nut block 25 through which a screw 26 is threadably extended. Fixed pins 27 project from opposite ends of the nut block through the side walls of the arm 19 and are journalled in bearing plates 28 whereby oscillations of the nut block are possible. As is shown in Figs. 2 and 3, the inner end of the screw 26 is carried by one of the units of the universal joint 21.

It will be observed from Figs. 1 and 2 that the side plates and top of the hollow arm 19 are, in fact, separate from the upright rear plate 18 which normally forms the inner end or back of the hollow arm and which supports ears 29 in which pivot pins 30 are journalled, the latter being carried by the arms of a U-bracket 31 through which the screw 26 is revolubly extended. Consequently, under certain conditions, when the shaft 20 is turned, through the engagement of the screw 26 with the nut block 25, up and down knee action of the hollow arm 19 is obtained with the work table 12, associated with the outer end of the arm, being thereby raised and lowered. During such movements that portion of the arm 19 which comprises the sides, top and bottom may pivotally move relative to the lower front portion of the plate 18 on the bearing pins 32 journalled in plate carried lugs 33.

The outer free end of the hollow arm assemblage 19 is provided with a fixed housing 34 which revolubly supports, on ball-bearings 35, a table post 36 which projects both above and below the ends of the housing 34 and has affixed to its upper end the work supporting table 12. The extended lower end portion of the post 36 carries a plurality of brake discs 37 which may be compressed into operating condition or released by means of a U-plate 38 which can be tightened or loosened relative to the brake discs, by a hand operated nut 39 threaded onto a stem 40 which extends into the post 36.

Means are emeployed for adjustably securing the bearing housing 11, and mechanism carried thereby, in various angular positions of adjustment relative to the supporting column 5—7. It will be observed that the upper margins of spaced-apart downwardly projecting webs 41 are secured to lower side wall portions of the housing 11 and enclose a transverse nut block 42 which is oscillatably mounted between the lower portions of the webs 41 by transverse pins 43 journalled in the walls of the webs 41. Threadably extended through the nut block 42 is a screw 44 having an outer end portion 45 adapted to receive the inner end of the crank 22 which may be removed from the shaft 20. The inner end portion of the screw 44 is threaded into a nut block 45 (see Fig. 2) which is oscillatably mounted between the lower end portions of the spaced trunnion posts 9, as at 46. Hence, when the crank 22 is applied to the end 45 of the screw 44 and turned in a proper direction, the bearing housing 11 may have its angular relationship relative to the supporting column 5—7 varied, as desired, pivoting on the members 13.

In the use of the improved universal work positioner an article or work piece to be operated upon is suitably secured to the work supporting table 12, either by securing the work piece directly to the table or by mounting the work in a suitable fixture secured to the table by securing means entering apertures 47 in the table. The center of gravity of the work and its securing means on the table 12 should be such that it lies in the axis of the work table post 36. In order that the work may be readily turned into various positions and to enable the work to remain in such positions without manual engagement, the hollow arm 19 is then adjusted relative to the sleeve 17 so that the center of gravity of the work, the arm 19, and the parts supported thereby including the table and the securing means for the work on the table, will lie in the axis of the sleeve 17. To obtain the center of gravity the arm 19 may be swung into a desired position by manually rotating the shaft 20 with the brake discs 24 released. The center of gravity is located by proper adjustments of the outer end portion of the arm 19 and ultimately it will be found that the supporting table 12 and arm 19 become balanced, through proper adjustments, so that they will remain in any angular position relative to the axis in which they are set.

When a given piece of work is thus properly adjusted, any number of similar work pieces of the same type may be mounted on the table 12 without readjusting the arm 19 and the workman may swing the work either about the axis of the table post 36 or about the adjusted axis of the sleeve 17. In the latter event the brake discs 23 will be released and, by turning the shaft 20, that part of the assemblage which includes the plate 18, hollow arm 19, and parts carried thereby, will turn with the shaft 20. The work, upon engaging the brake discs, will remain in any position in which it is moved about the several axes, thereby facilitating operations to be performed on the work and making all surfaces of the work accessible to an operating tool.

In addition to the normal operating adjustments previously described it is, of course, evident that by releasing the bolt 48 extended through ears at the split upper end portion of the sleeve 5, the post 7 and parts carried thereby may be turned or vertically adjusted. Also, as previously mentioned, the angular disposition of the bearing housing 11 may be operated by regulation of the screw 44.

The main shaft 20 is easily manually operated by means of the crank 22 and the same is true of the adjustment screw 44. The latter, when adjusted, maintains the housing 11 in a desired position of adjustment and the brake discs 23 associated with the housing 11 and the brake discs 37 associated with the work table post 36 can be easily manually set to hold the parts in adjusted position, or easily released.

The improved universal work positioner, besides serving to hold work in any universally adjusted balanced position, is susceptible of very easy and positive operation, and is well adapted for the purposes described.

What I claim is:

1. A universal work positioner, comprising a vertically and rotatably adjustable supporting column, a pair of trunnion posts carried thereby, a bearing housing, means vertically rockingly mounting the bearing housing on the trunnion posts, means for releasably securing the bearing housing in a selected vertically rocked position, a sleeve rotatably mounted within said bearing housing and having an extended forward end portion, a plate to which the extended portion of the sleeve is secured, a hollow arm pivotally mounted at its inner end portion on said plate, an operating shaft extended revolubly through said sleeve and plate and into the hollow arm, one end portion of the shaft being secured to the sleeve in a manner to prevent axial movement of the shaft while permitting rotation relative to the sleeve, there being a universal joint connection between an intermediate portion of the operating shaft and the arm, an end portion of the shaft within the arm being externally threaded, an internally threaded nut horizontally pivotally mounted within said arm and engaged by the threaded portion of the shaft, and a work supporting table rotatably mounted on the outer end portion of the arm to rotate on an axis substantially at right angles to the axis of the arm.

2. A universal work positioner, comprising a vertically and rotatably adjustable supporting column, a pair of trunnion posts carried thereby, a bearing housing, means vertically rockingly mounting the bearing housing on the trunnion posts, means for releasably securing the bearing housing in a selected vertically rocked position, a sleeve rotatably mounted within said bearing housing and having an extended forward end portion, a plate to which the extended portion of the sleeve is secured, a hollow arm pivotally mounted at its inner end portion on said plate, an operating shaft extended through said sleeve and plate and into the hollow arm, one end portion of the shaft being secured to the sleeve in a manner to prevent axial movement of the shaft while permitting rotation relative to the sleeve, there being a universal joint connection between an intermediate portion of the operating shaft and the arm, an end portion of the shaft within the arm being externally threaded, an internally threaded nut horizontally pivotally mounted within said arm and engaged by the threaded portion of the shaft, a work supporting table rotatably mounted on the outer end portion of the arm to rotate on an axis substantially at right angles to the axis of the arm, and means for manually operating the shaft.

3. A universal work positioner, comprising a supporting column, a trunnion carried thereby, a bearing housing, means vertically rockingly mounting the bearing housing on the trunnion, means for releasably securing the bearing housing in a selected vertically rocked position, a sleeve rotatably mounted within said bearing housing and having an extended forward end portion, a plate to which the extended portion of the sleeve is secured, a hollow arm pivotally mounted at its inner end portion on said plate, an operating shaft extended through said sleeve and plate and into the hollow arm, one end portion of the shaft being secured to the sleeve in a manner to prevent axial movement of the shaft while permitting rotation relative to the sleeve, there being a universal joint connection between an intermediate portion of the operating shaft and the arm, an end portion of the shaft within the arm being externally threaded, an internally threaded nut horizontally pivotally mounted within said arm and engaged by the threaded portion of the shaft, and a work supporting table rotatably mounted on the outer end portion of the arm to rotate on an axis substantially at right angles to the axis of the arm, and adjustable means for angularly adjusting the arm relative to the axis of the shaft or for turning the arm with the shaft.

4. A universal work positioner, comprising an adjustable supporting column, a trunnion post carried thereby, a bearing housing, means vertically rockingly mounting the bearing housing on the trunnion post, screw means for rocking the bearing housing relative to the column and in a vertical plane, means for releasably securing the bearing housing in an adjusted position, a sleeve rotatably mounted within said bearing housing and having an extended forward end portion, a plate to which the extended portion of the sleeve is secured, a hollow arm pivotally mounted at its inner end portion on said plate, an operating shaft operatively extended through said sleeve and plate and into the hollow arm, one end portion of the shaft being secured to the sleeve in a manner to prevent axial movement of the shaft while permitting rotation relative to the sleeve, there being a universal joint connection between an intermediate portion of the operating shaft and the arm, an end portion of the shaft within the arm being externally threaded, an internally threaded nut horizontally pivotally mounted within said arm and engaged by the threaded portion of the shaft, a work supporting table, a post for said table rotatably mounted on the outer end portion of the arm to rotate on an axis substantially at right angles to the axis of the arm, brake means for controlling rotation of said post, and brake means controlling said housing sleeve whereby upon turning of the shaft the arm may turn with the shaft or be moved on the universal joint angularly relative to the axis of the shaft.

References Cited in the file of this patent

UNITED STATES PATENTS

| | | |
|---|---|---|
| 2,396,161 | Cullen | Mar. 5, 1946 |
| 2,477,169 | Brekelbaum | July 26, 1949 |
| 2,488,296 | Kraus | Nov. 15, 1949 |
| 2,495,438 | Bently et al. | Jan. 24, 1950 |
| 2,536,614 | Syracusa | Jan. 2, 1951 |